(12) United States Patent
Imai (10) Patent No.: US 8,711,446 B2
(45) Date of Patent: Apr. 29, 2014

(54) READING APPARATUS AND READING METHOD

(75) Inventor: Toshie Imai, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 113 days.

(21) Appl. No.: 13/427,092

(22) Filed: Mar. 22, 2012

(65) Prior Publication Data

US 2012/0243060 A1    Sep. 27, 2012

(30) Foreign Application Priority Data

Mar. 22, 2011 (JP) ................................. 2011-062772

(51) Int. Cl.
*H04N 1/04* (2006.01)

(52) U.S. Cl.
USPC ............ 358/475; 358/474; 358/498; 358/497

(58) Field of Classification Search
USPC .......................... 358/475, 474, 498, 497, 496
See application file for complete search history.

(56) References Cited

U.S. PATENT DOCUMENTS

| 5,907,434 A | * | 5/1999 | Sekine et al. ................. 359/462 |
| 7,038,228 B2 | * | 5/2006 | Hasegawa et al. ............ 250/556 |
| 7,750,330 B2 | * | 7/2010 | Murata ...................... 250/559.4 |
| 8,363,269 B2 | * | 1/2013 | Obata ............................ 358/1.9 |
| 2002/0018249 A1 | * | 2/2002 | Yamakawa et al. ........... 358/475 |
| 2002/0149805 A1 | * | 10/2002 | Tanaka et al. ................ 358/498 |
| 2005/0088710 A1 | * | 4/2005 | Nakayama ................... 358/518 |
| 2005/0281596 A1 | * | 12/2005 | Nakagawa et al. ........... 399/350 |
| 2010/0055424 A1 |  | 3/2010 | Yoshida et al. |

FOREIGN PATENT DOCUMENTS

JP     2010-052247 A     3/2010

\* cited by examiner

*Primary Examiner* — Houshang Safaipour
(74) *Attorney, Agent, or Firm* — Nutter McClennen & Fish LLP; John J. Penny, Jr.; Megan E. Jeans (57) ABSTRACT

Provided is a reading apparatus that includes a light source that emits a light to a source material and a plurality of image pickup elements that each receive the light reflected by the source material, to thereby read the source material. The plurality of image pickup elements are each located at different positions and each mounted at different angles with respect to a surface to be read of the source material. The reading apparatus compares read values acquired from the image pickup elements, so as to decide the property of the image expressed on the source material.

8 Claims, 5 Drawing Sheets

READING APPARATUS AND READING METHOD

BACKGROUND

1. Technical Field

The present invention relates to a reading apparatus and a reading method.

2. Related Art

A scanner for reading an image is configured so as to emit a light from a light source to a source material while moving an image pickup element relatively to the source material, and receiving the reflected light from the source material at the image pickup element, thereby reading the image expressed on the source material. The image pickup element is generally mounted so as to receive the reflected light at a certain fixed angle, specifically at 45 degrees with respect to an optical path of the light incident on the source material from the light source.

Examples of the source material to be read by the scanner include source materials with matt appearance, those with glossy appearance, those with metallic texture, and so forth. Examples of the glossy source material include photos printed on photo paper, and source materials printed with a clear ink for forming a gloss layer on a paper sheet. Examples of the source material with metallic texture include those printed with a metallic ink containing a metallic pigment. The metallic ink serves to provide a metallic texture to the finish of the printed material (see, for example, JP-A-2010-52247). Such a texture obtained from the metallic ink (metallic texture) may be considered as a kind of gloss, so to say an especial gloss.

Now, in the case of reading a glossy source material or a source material with metallic texture, the mounting angle of the image pickup element may constitute an issue, i.e., may affect the reading result. This is because an amount of light reflected by a glossy source material or source material with metallic texture is not uniform but differs depending on the reflection angle. Accordingly, reading the glossy or metallic source material with the image pickup element mounted at a fixed angle may result in failure to accurately read the feature of the source material, and consequently the image data generated on the basis of the read image may fail to enable accurately reproduction of the image expressed on the source material. In addition, when the image data thus generated is subjected to printing (when the source material is copied), the feature of the source material cannot be not precisely reproduced on the copy, in other words the glossy appearance or metallic texture is not reproduced on the copy although the source material has glossy appearance or metallic texture.

SUMMARY

An advantage of some aspects of the invention is that a technique for reading a source material from a plurality of angles is provided. Another advantage is that a technique is provided that enables accurate information of the source material, including the special feature thereof, to be acquired upon reading the source material.

In an aspect, the invention provides a reading apparatus that includes a light source that emits a light to an object to be read and a plurality of image pickup elements that each receive the light reflected by the object to be read, to thereby read the object to be read. The plurality of image pickup elements are each located at different positions and each mounted at different angles with respect to a surface to be read of the object to be read.

The thus-configured reading apparatus can read the object to be read with each of the plurality of image pickup elements mounted at different angles with respect to the surface to be read of the object to be read. In addition, each of the light beams reflected at different angles by the object to be read can be captured, and therefore information necessary for accurately reading the object to be read can be properly acquired.

Preferably, the reading apparatus may further include a decision unit that compares read values obtained by the plurality of image pickup elements to thereby decide a property of an image expressed on the object to be read.

With such a configuration, a feature or property of the image expressed on the object to be read can be defined.

Preferably, the decision unit may decide the property of the image with respect to each of partial regions of the image.

Such an arrangement allows not only the property of the overall image of the object to be read, but also the property of each individual region of the image to be defined. The term "region" herein referred to means a part of the image, which may be formed of a plurality of pixels or of each single pixel.

Preferably, the decision unit may add information indicating a result of the decision to the image data generated by the image pickup element upon reading the object to be read.

In this case, the information indicating the property of the image (or each region of the image) is added to the image data generated upon reading the object to be read. Accordingly, the added information can be looked up when data is outputted on the basis of the image data (for example, when the image is printed), so that the image representing the object to be read can be precisely reproduced.

Preferably, the decision unit may decide that the image is presenting a glossy appearance in the case where a read value acquired from a specific image pickup element mounted at a specific angle among the plurality of image pickup elements is prominently higher than read values acquired from the image pickup elements other than the specific image pickup element, and a difference between the read values acquired from the image pickup elements other than the specific image pickup element is within a predetermined range.

With such an arrangement, it can be decided whether the image (or each region thereof), corresponding to the object to be read, is presenting a glossy appearance. In addition, in the case where the image is decided to be presenting a glossy appearance, such a decision result is added to the image data when data is outputted on the basis of the image data (for example, when the image is printed), so that the image presenting the glossy appearance can be precisely reproduced.

Preferably, the decision unit may decide that the image is expressing a metallic texture in the case where a read value acquired from a specific image pickup element mounted at a specific angle among the plurality of image pickup elements is prominently higher than read values acquired from the plurality of image pickup elements other than the specific image pickup element, and the read values acquired from the plurality of image pickup elements vary in a predetermined variation pattern.

With such an arrangement, it can be decided whether the image (or each region thereof), corresponding to the object to be read, is expressing a metallic texture. In addition, in the case where the image is decided to be expressing a metallic texture, such a decision result is added to the image data when data is outputted on the basis of the image data (for example, when the image is printed), so that the image expressing the metallic texture can be precisely reproduced.

Preferably, the reading apparatus may include a warning unit that performs a predetermined warning operation in the case where a difference between the read values exceeds a predetermined amount as a result of the comparison.

Such a configuration enables the user to be warned of an object to be read that may fail to be accurately read, thereby allowing the user to take a necessary action.

The technical idea according to the invention may be realized in various forms in addition to the category of the reading apparatus. For example, a method of reading performed by a reading apparatus can be conceived, the reading apparatus including a light source that emits a light to an object to be read and a plurality of image pickup elements that each receive the light reflected by the object to be read to thereby read the object to be read, in which the plurality of image pickup elements are each located at different positions and mounted at different angles with respect to a surface to be read of the object to be read. Further, a program can be conceived that causes the reading apparatus to perform reading by using the plurality of image pickup elements. The reading apparatus may be a single-function independent unit such as a scanner, or a multifunction apparatus having a part or whole of the functions of a printer, a copier, a facsimile machine, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
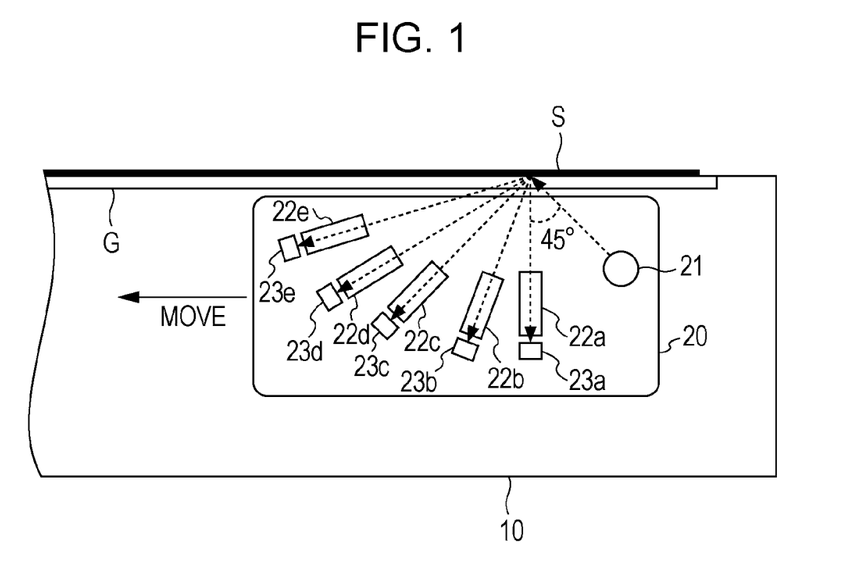
FIG. 1 is a schematic side view showing a part of a reading apparatus according to the invention.

Hereafter, an embodiment of the invention will be described referring to the drawings.
1. Configuration of Apparatus FIG. 1 is a schematic side view showing a part of a reading apparatus 10 according to the embodiment of the invention. The reading apparatus 10 includes a source material table G formed of glass or the like, on which a source material S, corresponding to the object to be read, is placed. The upper face of the source material S is covered with a lid which is not shown. Inside a casing of the reading apparatus 10, an image pickup unit 20 is provided under the source material table G. The image pickup unit 20 includes a light source 21 and a plurality of image pickup elements 23a, 23b, 23c, 23d, 23e. The light source 21 is for example an LED, and emits a light to the source material S. The image pickup elements 23a, 23b, 23c, 23d, 23e are each located at different positions in the image pickup unit 20, and receives a reflected light from the source material S to thereby read the source material S. A plurality of lenses 22a, 22b, 22c, 22d, 22e are each disposed between a corresponding one of the plurality of image pickup elements 23a, 23b, 23c, 23d, 23e and the source material table G, so that the respective image pickup elements receive the light condensed by the corresponding lens.

Each of the image pickup elements is, for example, a linear sensor in which a plurality of pixels (photodetectors) are aligned in a widthwise direction (main scanning direction, i.e., depthwise direction in FIG. 1) of a reading range generally corresponding to the area of the source material table G, and performs photoelectric conversion of the light received by the photodetector and A/D conversion of the electrical signal, to thereby output a digital value (RGB value) of each pixel. As shown in FIG. 1, the image pickup elements (and the lenses corresponding to each image pickup element) are mounted at different angles with respect to the surface to be read of the source material S (or the plane including the source material table G). The image pickup unit 20 can be moved by a drive mechanism 30 (see FIG. 2) parallel to the source material table G in a direction perpendicular to the main scanning direction of the source material table G (sub scanning direction). Accordingly, reading the source material S with the image pickup elements 23a, 23b, 23c, 23d, 23e while thus moving the image pickup unit 20 allows the source material S to be simultaneously read from a plurality of angles.

In the configuration shown in FIG. 1, the image pickup element 23a closest to the light source 21 is mounted such that the direction in which the image pickup element 23a is oriented defines an angle of 45 degrees with respect to an incident path of the light from the light source 21 to the source material S, which is typically set at 45 degrees with respect to the source material S. The remaining image pickup elements 23b, 23c, 23d, 23e are sequentially located farther from the light source 21, and hence a wider angle is defined between the incident path and the image pickup element farther from the light source 21. In addition, a specific one of the plurality of image pickup elements 23a, 23b, 23c, 23d, 23e (image pickup element 23c in the example shown in FIG. 1) is mounted at an angle that allows the image pickup element 23c to receive the reflected light at the specular reflection angle with respect to the light source 21. In other words, the angle defined between the incident path and the source material S equals to the angle defined between the direction in which the specific image pickup element is oriented and the source material S.

Figure 2:
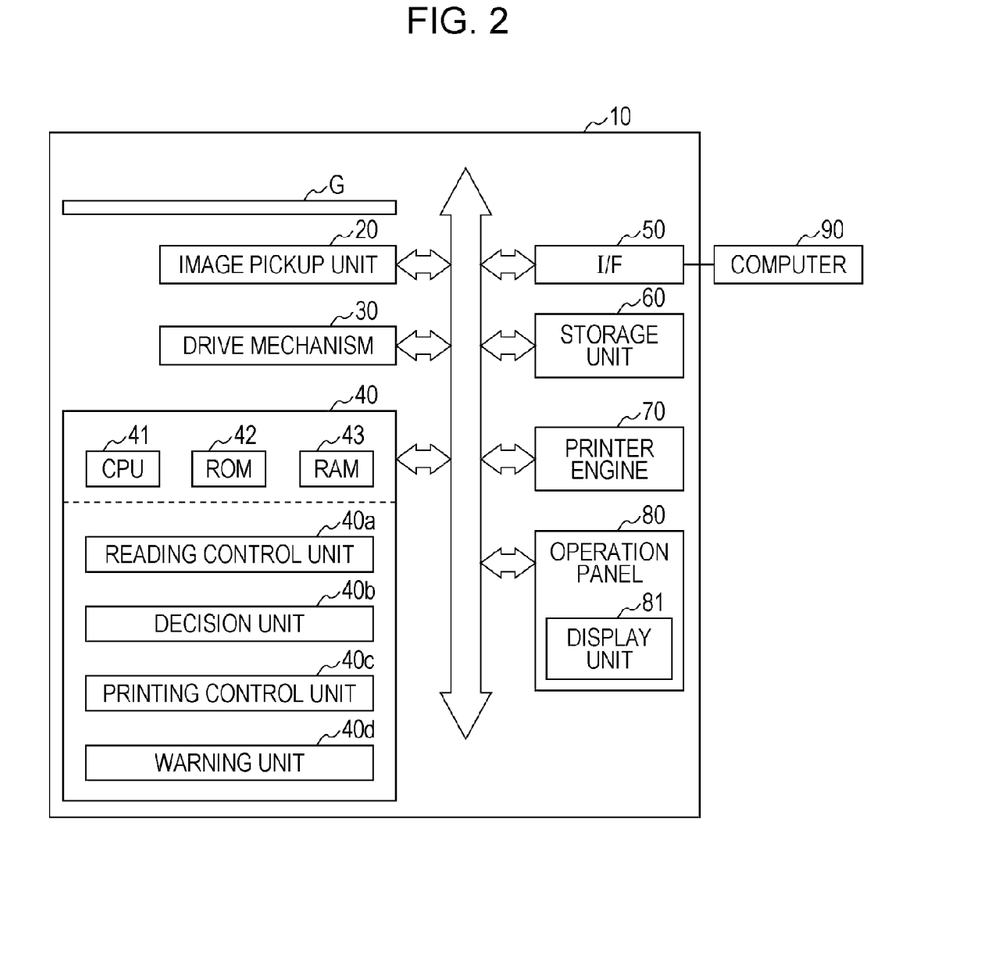
FIG. 2 is a block diagram showing a general configuration of the reading apparatus.

FIG. 2 is a block diagram showing a general configuration of the reading apparatus 10. In FIG. 2, the reading apparatus 10 is exemplified by a multifunction apparatus. The reading apparatus 10 includes a control unit 40 that controls the functional components of the reading apparatus 10. The control unit 40 includes a CPU 41, a ROM 42, a RAM 43 and so forth, so that the CPU 41 performs arithmetic operations in accordance with program data stored in the ROM 42 by using the RAM 43 as a work area, to thereby realize the functions of a reading control unit 40a, a decision unit 40b, a printing control unit 40c, and a warning unit 40d. The reading apparatus 10 also includes an interface (I/F) 50 for communication with an external apparatus. In the example shown in FIG. 2, the reading apparatus 10 is connected to a computer 90 through the I/F 50.

The reading apparatus 10 may further include a storage unit 60 constituted of a hard disk drive (HDD) or the like, a printer engine 70, and an operation panel 80. The printer engine 70 is a printing mechanism that performs printing on a printing medium in accordance with printing data generated by the printing control unit 40c. The operation panel 80 includes a display unit 81 composed of an LCD or the like, a touch panel provided over the display unit 81, and some keys and buttons. The operation panel 80 accepts instructions of a user through the touch panel, keys, and buttons, and displays necessary information on the display unit 81 as the case may be. The components of the reading apparatus 10 are connected to each other through a bus.

The reading control unit 40*a* controls the image pickup unit 20 and the drive mechanism 30 so as to cause the drive mechanism 30 to move the image pickup unit 20, and causes each image pickup element to read the source material S, to thereby acquire read image data (data possessing the RGB values with respect to each pixel) representing the reading result of the source material S. The drive mechanism 30 includes a motor, a carriage and so forth employed for moving the image pickup unit 20. The printing control unit 40*c* generates printing data on the basis of the read image data outputted from the reading control unit 40*a* (step S230 in FIG. 3 to be subsequently described), and causes the printer engine 70 to perform printing in accordance with the printing data. In this process, the printing control unit 40*c* performs, with respect to the read image data, color conversion from an RGB colorimetric system to an ink colorimetric system, halftone processing with respect to the data obtained by the color conversion (ink amount data), rasterization of the halftone data and so forth, to thereby generate the printing data corresponding to the image expressed on the source material S.

The reading control unit 40*a* may store the read image data in the storage unit 60 or transmit the read image data to the computer 90 through the I/F 50. Alternatively, the reading apparatus 10 may be controlled by the computer 90 so as to be driven. More specifically, the reading apparatus 10 may read the source material S, perform printing (copying) of the read image data generated by the reading control unit 40*a* upon reading the source material S, or transmit the read image data to the computer 90, in accordance with a command transmitted from the computer 90 based on a scanner controlling program (driver) installed in the computer 90.

Although the reading apparatus 10 is configured so as to move the image pickup unit 20 with the source material S retained at a fixed position to thereby scan the entirety of the source material S, the source material S may be moved in the sub scanning direction with the image pickup unit 20 mounted at a fixed position. Alternatively, the image pickup unit 20 may be formed in a smaller size in the main scanning direction, so as to be moved in the main scanning direction by a carriage. In this case, the entirety of the source material S can be scanned by repetitions of reading an image corresponding to one line of the source material while moving the image pickup unit 20 in the main scanning direction, and then moving the source material S (or image pickup unit 20) in the sub scanning direction, after reading one line, at a pitch corresponding to the reading resolution in the sub scanning direction.

Further, the number of image pickup elements in the reading apparatus 10 is not limited to five as shown in FIG. 1, but may be any number not fewer than two.

2. Reading Control Process

Figure 3:
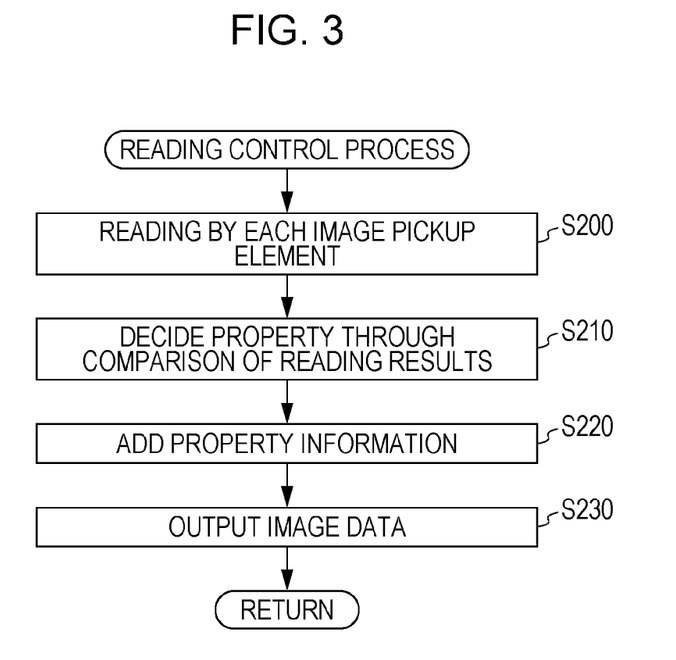
FIG. 3 is a flowchart showing a reading control process.

FIG. 3 is a flowchart showing a reading control process performed by the control unit 40. At a step S200, the reading control unit 40*a* controls the image pickup unit 20 and the drive mechanism 30 so as to cause the drive mechanism 30 to drive the image pickup unit 20, and causes each of the image pickup elements 23*a*, 23*b*, 23*c*, 23*d*, 23*e* to read the source material S. Then the image pickup elements 23*a*, 23*b*, 23*c*, 23*d*, 23*e* each output the read image data to the decision unit 40*b*.

At a step S210, the decision unit 40*b* compares the respective read image data outputted by the image pickup elements 23*a*, 23*b*, 23*c*, 23*d*, 23*e*, to thereby decide the property of the image expressed on the source material S. In this process, the decision unit 40*b* compares the read image data from the image pickup elements 23*a*, 23*b*, 23*c*, 23*d*, 23*e* with respect to values corresponding to the same pixel. The value for the comparison (read value) may be a specific value among RGB, or a value obtained by summing the values of RGB each weighted by a predetermined ratio (luminance). Thus, in the case where five image pickup elements are provided as shown in FIG. 1, five read values are used for the comparison with respect to a pixel, at the step S210.

Figure 4A:
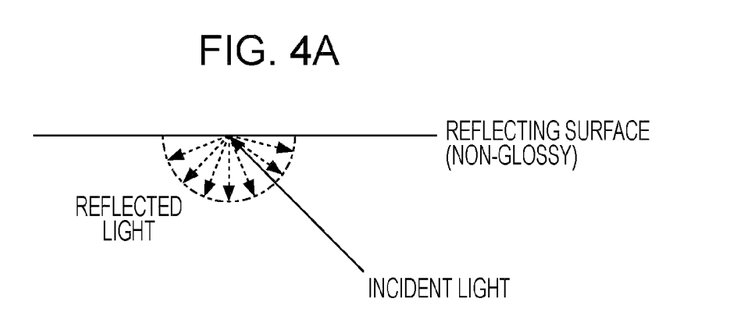
FIGS. 4A to 4C are diagrams showing reflections of light that differ depending on a feature of a reflecting surface.
Figure 4B:
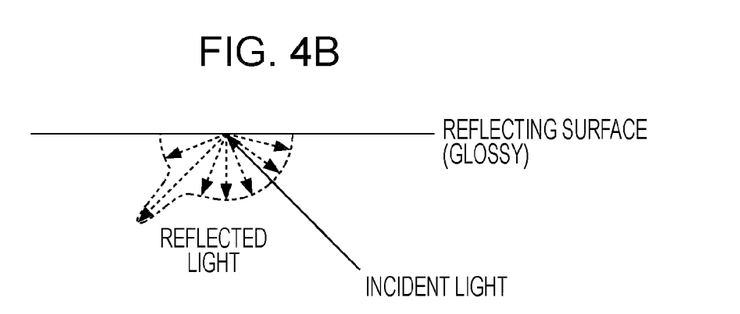
Figure 4C:
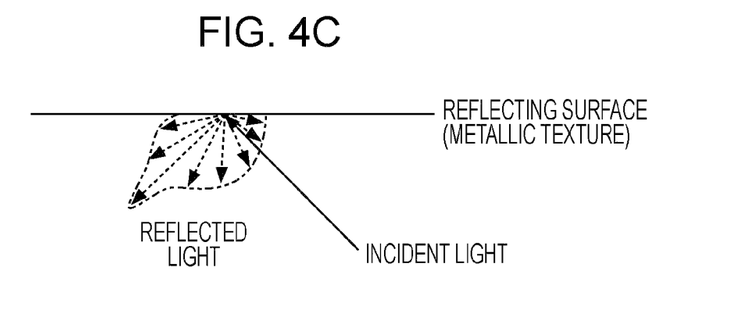

FIGS. 4A to 4C are diagrams showing reflections of light that differ depending on the feature of the reflecting surface of the source material S. In FIGS. 4A, to 4C, the optical path of incident light (incident angle: 45 degrees) is indicated by solid lines, and a part of the optical path of the reflected light is indicated by broken lines. As shown in FIG. 4A, in the case where the reflecting surface of the source material S is not presenting gloss nor especial gloss, i.e., is presenting a matt texture, the light reflected by such a surface possesses generally the same light amount in all reflecting directions. In contrast, as shown in FIG. 4B, in the case where the reflecting surface of the source material S is presenting gloss, but not the especial gloss, the light reflected by such a surface possesses an outstanding light amount at the specular reflection angle, but possesses generally the same light amount in the remaining reflecting directions. Further, as shown in FIG. 4C, in the case where the source material S is printed with a metallic ink and hence the surface thereof is presenting a metallic texture (especial gloss), the light reflected by such a surface possesses an outstanding light amount at the specular reflection angle, and the light amount gradually decreases from that at the specular reflection angle, in the remaining reflecting directions.

At the step S210, therefore, the decision unit 40*b* decides, upon comparing the read values outputted by the image pickup elements 23*a*, 23*b*, 23*c*, 23*d*, 23*e* with respect to a subject pixel, that the subject pixel is not presenting gloss nor especial gloss (property: non-glossy) in the case where a difference between the read values (difference between the maximum value and the minimum value among the read values of all the image pickup elements) is within a predetermined numerical range.

In contrast, the decision unit 40*b* decides, upon comparing the read values from the image pickup elements 23*a*, 23*b*, 23*c*, 23*d*, 23*e* with respect to the subject pixel, that the subject pixel is presenting gloss but not the especial gloss (property: glossy), in the case where the read value of the specific image pickup element (image pickup element 23*c*) corresponding to the specular reflection angle is outstandingly higher than the read values from the image pickup elements other than the specific image pickup element (image pickup elements 23*a*, 23*b*, 23*d*, 23*e*), and a difference between the read values from the image pickup elements other than the specific image pickup element (difference between the maximum value and the minimum value among the read values from the image pickup elements other than the specific image pickup element) is within the predetermined numerical range. Here, whether the read value of the specific image pickup element is outstandingly higher than the read values from the image pickup elements other than the specific image pickup element may be decided, for example, on the basis of whether a difference between the read value of the specific image pickup element and the maximum read value among those from the image pickup elements other than the specific image pickup element is greater than a predetermined differential value.

Further, the decision unit 40*b* decides, upon comparing the read values from the image pickup elements 23*a*, 23*b*, 23*c*, 23*d*, 23*e* with respect to the subject pixel, that the subject pixel is presenting a metallic texture (property: especial gloss), in the case where the read value of the specific image pickup element (image pickup element 23c) corresponding to the specular reflection angle is outstandingly higher than the read values from the image pickup elements other than the specific image pickup element (image pickup elements 23a, 23b, 23d, 23e), and the read values of the respective image pickup elements present a predetermined variation pattern. Here, the decision unit 40b decides that the read values from the image pickup elements present the predetermined variation pattern in the case, for example, where the difference between the maximum and minimum read values from the image pickup elements other than the specific image pickup element exceeds the predetermined numerical range, and the read value from one of the image pickup elements other than the specific image pickup element is higher than that of an adjacent image pickup element on the opposite side of the specific image pickup element (image pickup element 23a when viewed from image pickup element 23b, and image pickup element 23e when viewed from image pickup element 23d).

The decision unit 40b performs such a decision of the property with respect to each pixel constituting the read image data.

At the step S220, the decision unit 40b adds, to the read image data, information indicating the property of the image (property information) decided at the step S210 with respect to each pixel. The read image data to which the property information is added is the data to be subjected to various processings subsequent to the reading control process that follows the reading by the image pickup unit 20 and, basically, the read image data from one of the plurality of image pickup elements is adopted. In this embodiment, the property information is to be added to the read image data from the image pickup element 23a. For example, the decision unit 40b records the property information in the alpha channel of the read image data. The read image data contains, with respect to each pixel, information in RGB channels (for instance, each channel contains information of 8 bits=256 gradations), and also possesses another channel (alpha channel), in which the decision unit 40b records the property information about the relevant pixel. In other words, the decision unit 40b converts the read image data to which the property information is to be added to an image file of a predetermined format that includes the alpha channel, and records the property information in the alpha channel of each pixel. In this embodiment, the decision unit 40b records, at least with respect to pixels decided to have the property of "gloss" or "especial gloss", the property information that uniquely identifies such properties.

However, in the read image data to which the property information is added, the RGB channels of all the pixels do not always represent the read image data from the one of the image pickup elements (image pickup element 23a). This is because, in the case of the source material with metallic texture in particular, such image data as barely expressing a hue and only representing white and black may sometimes be acquired as a result of reading, depending on the angle of the image pickup element that receives the reflected light. Accordingly, the decision unit 40b adopts the RGB values representing the highest chroma among those acquired as a result of reading by the image pickup elements 23a, 23b, 23c, 23d, 23e (RGB values maintaining a hue of the source material S), as the information of the RGB channel, with respect to the pixel having the property of "especial gloss". The evaluation method of chroma is not specifically limited. For example, the RGB values may be converted into L*a*b* values of a device-independent colorimetric system by using a predetermined colorimetric system conversion formula to thereby evaluate the chroma, or simply a difference between the maximum value and the minimum value among the elements of the RGB values may be regarded as chroma, for evaluation.

Figure 5:
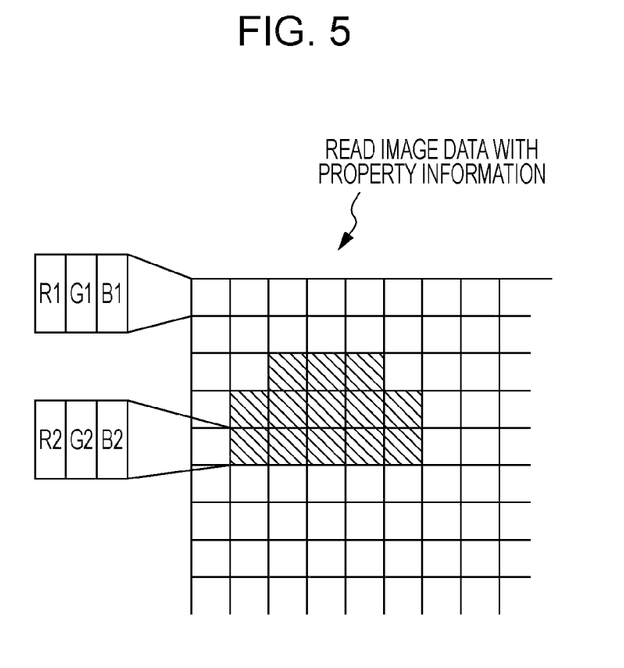
FIG. 5 is a schematic diagram showing a part of read image data.

FIG. 5 is a schematic diagram showing a part of the read image data obtained at the step S220. In FIG. 5, hatched pixels among a plurality of rectangular pixels are those bearing the property information of "especial gloss". In other words, since a partial region of the source material S to be read is printed with a metallic ink, the property information of "especial gloss" is recorded (in the alpha channel) in those pixels corresponding to that partial region, as a result of comparison of the read values from the image pickup elements 23a, 23b, 23c, 23d, 23e. In FIG. 5, the RGB values (R1, G1, B1) read by the image pickup element 23a are adopted as information of the RGB channels with respect to the pixels other than those in the partial region, however in the pixels in the partial region, the RGB values representing the highest chroma among those read by the image pickup elements 23a, 23b, 23c, 23d, 23e (for example, R2, G2, B2 read by the image pickup element 23b) are adopted as the information of the RGB channels. In FIG. 5, however, the alpha channel is not illustrated.

At the step S230, the reading control unit 40a outputs the read image data (image file) bearing the property information, acquired through the steps up to S220. The term "output" herein refers to outputting to the printing control unit 40c, to the storage unit 60, and to the computer 90 through the I/F 50. In other words, the output destination of the read image data bearing the property information is determined by an instruction through the operation panel 80 or an instruction from the computer 90 (for example, instruction to copy the source material S, to store the scanning result in the reading apparatus 10, to store the scanning result in the computer 90, and so forth).

Thus, the reading apparatus 10 according to this embodiment includes the image pickup unit 20 including the light source 21 and the plurality of image pickup elements 23a, 23b, 23c, 23d, 23e each mounted at different angles with respect to the surface to be read of the source material S. The reading apparatus 10 can simultaneously read the source material S with the plurality of image pickup elements, by driving the image pickup elements while shifting the relative positional relationship between the image pickup unit 20 and the source material S. Such a configuration allows the light reflected at different angles by the source material S to be received by the respective image pickup elements mounted at different angles, thereby enabling information necessary for accurately reading the source material S to be properly acquired.

In particular, by the reading method that employs the image pickup element mounted at a fixed angle, it is difficult to decide whether the source material S includes a region that presents a glossy appearance or metallic texture, or which region of the source material S is presenting a glossy appearance or metallic texture. According to this embodiment, however, the foregoing decision can be made by reading the source material S with each of the plurality of image pickup elements mounted at different angles with respect to the source material S, and comparing the respective reading results. On the basis of the decision thus made, the information of the glossy appearance or metallic texture (property information) can be added to the read image data outputted by the reading control unit 40a at the step S230. Accordingly, in the case of printing the read image data bearing the property information at a subsequent stage, for example a clear ink may be employed for a region corresponding to the property information of "gloss" and a metallic ink may be employed for a region corresponding to the property information of "especial gloss", so that the texture equivalent to that of the source material S that has been read can be precisely reproduced in a copied material. In addition, in the case of displaying an image based on the read image data bearing the property information on a predetermined display device, an appropriate image processing (data processing) may be performed on the region corresponding to the property information of "gloss" or "especial gloss", to thereby express the equivalent texture to that of the source material S that has been read on the display device.

3. Variations

The invention is in no way limited to the foregoing embodiment, but may be modified in various manners within the scope and spirit of the invention. To cite a few examples, the following variations may be adopted. Combinations of the foregoing embodiment and one or more of the following variations are also included in the scope of the invention.

Variation 1

In the foregoing reading control process, a predetermined warning may be outputted in the case where a difference between the read values exceeds a predetermined amount as a result of comparison of the read values acquired from the plurality of image pickup elements. For example, the decision unit 40b may decide that the source material is not presenting an ordinary image, in the case where a difference between the read values (difference between the maximum value and the minimum value among the read values from the image pickup elements) exceeds the predetermined numerical range as a result of comparison of the read image data from the image pickup elements 23a, 23b, 23c, 23d, 23e with respect to the subject pixel, and comparison of the read values from the image pickup elements 23a, 23b, 23d, 23e with respect to a subject pixel. The "ordinary image" herein refers to a non-glossy image, from which the hue can be accurately read irrespective of the angle at which the image pickup element is mounted. Pixels presenting a glossy appearance or metallic texture are not decided to be an ordinary image. The decision unit 40b causes the warning unit 40d to output a warning in the case where the image on the source material is not an ordinary image. The warning unit 40d displays a predetermined warning message on the display unit 81 of the operation panel 80 or the display of the computer 90. For example, the warning unit 40d displays a message to the effect that the source material S being read fails (or may fail) to be properly read.

Such a configuration allows the user to decide whether to cancel the scanning of the source material S to be read, in view of the warning message displayed. For example, the user can press either a "continue" button or a "cancel" button displayed together with the warning message on the display unit 81 (or the display of the computer 90), to thereby instruct whether to continue or cancel the scanning. If "continue" is selected the step S210 and the subsequent process is performed, and if "cancel" is selected the process shown in FIG. 3 is aborted at this time point.

Variation 2

The region where the property of the image decided at the step S210 is to be stored is not limited to the alpha channel. For example, the decision unit 40b may convert the read image data to which the property information is to be added into an image file of JPEG format, and record the property information of each pixel in the information region of the image file, called a maker note.

Variation 3

The "ink" herein referred to is not limited to a liquid ink, but more broadly encompasses, for example, a toner employed in a laser printer. Other examples encompassed in the "ink" in its broader sense include "coloring material", "coloring agent", and "colorant".

What is claimed is:

1. A reading apparatus comprising:
   a light source that emits a light to an object to be read;
   a plurality of image pickup elements that each receive the light reflected by the object to be read, to thereby read the object to be read; and
   a decision unit that compares read values obtained by the plurality of image pickup elements to thereby decide a property of an image expressed on the object to be read with respect to each of partial regions of the image,
   wherein the plurality of image pickup elements are each located at different positions and each mounted at different angles with respect to a surface to be read of the object to be read.

2. The reading apparatus according to claim 1,
   wherein the decision unit adds information indicating a result of the decision to image data generated by the image pickup element upon reading the object to be read.

3. The reading apparatus according to claim 1,
   wherein the decision unit decides that the image is presenting a glossy appearance in the case where a read value acquired from a specific image pickup element mounted at a specific angle among the plurality of image pickup elements is prominently higher than read values acquired from the image pickup elements other than the specific image pickup element, and a difference between the read values acquired from the image pickup elements other than the specific image pickup element is within a predetermined range.

4. The reading apparatus according to claim 1,
   wherein the decision unit decides that the image is expressing a metallic texture in the case where a read value acquired from a specific image pickup element mounted at a specific angle among the plurality of image pickup elements is prominently higher than read values acquired from the plurality of image pickup elements other than the specific image pickup element, and the read values acquired from the plurality of image pickup elements vary in a predetermined variation pattern.

5. The reading apparatus according to claim 1, further comprising a warning unit that performs a predetermined warning operation in the case where a difference between the read values exceeds a predetermined amount as a result of the comparison.

6. A reading method to be performed by a reading apparatus that includes a light source that emits a light to an object to be read and an image pickup element that receives the light reflected by the object to be read to thereby read the object to be read,
   the method comprising employing a plurality of image pickup elements each located at different positions and each mounted at different angles with respect to a surface to be read of the object to be read, reading the object to be read; and
   comparing read values obtained by the plurality of image pickup elements to thereby decide A property of an image expressed on the object to be read with respect to each of partial regions of the image.

7. The reading apparatus according to claim 1, wherein the read values include RGB values.

8. The reading apparatus according to claim 7, wherein when the decision unit decides that the image is expressing a metallic texture, the decision unit adds an RGB value representing a highest chroma of the RGB values to image data generated by one of the image pickup elements upon reading the object to be read.

* * * * *